D. BROWN.
PROCESS OF AND APPARATUS FOR MOLDING CLAY PRODUCTS.
APPLICATION FILED MAR. 13, 1918.
1,347,484.
Patented July 20, 1920.
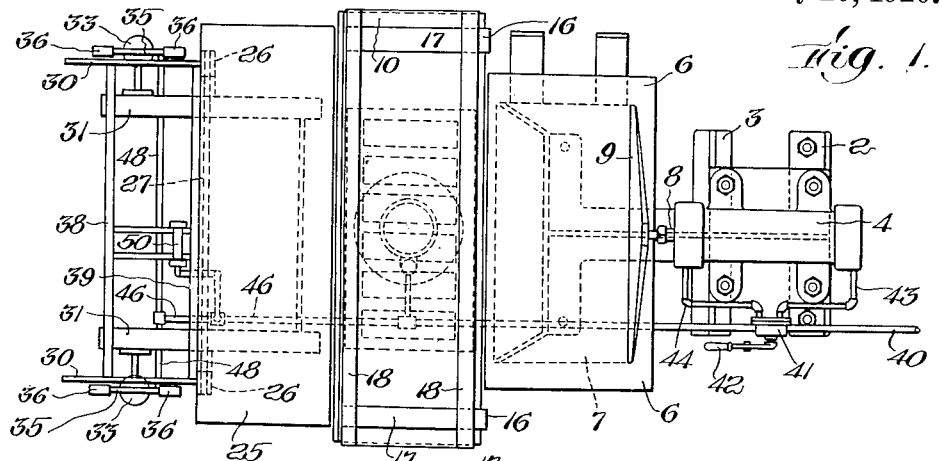
Fig. 1.
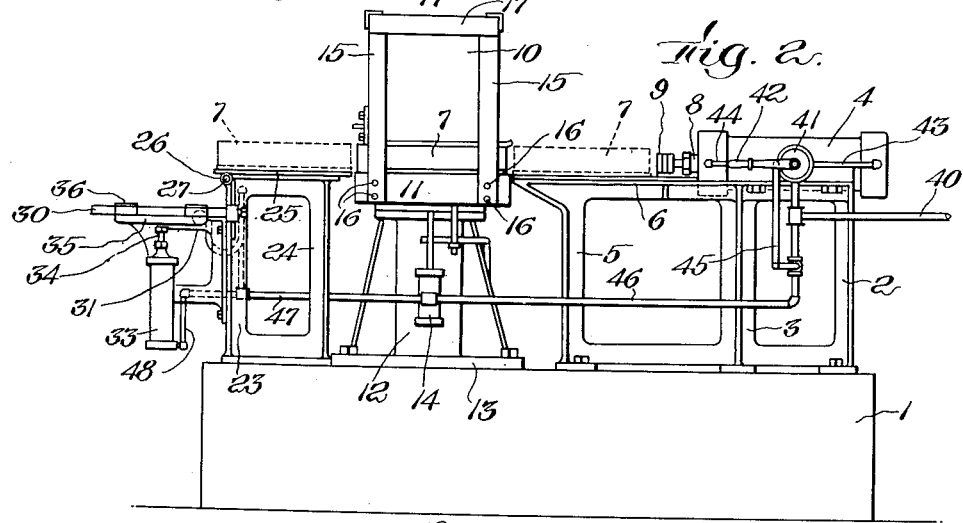
Fig. 2.
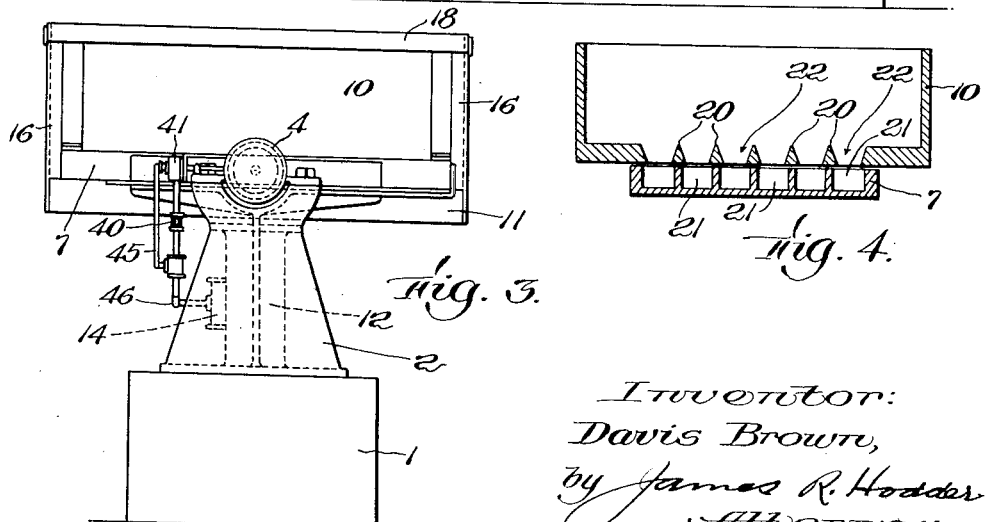
Fig. 3.
Fig. 4.
Inventor:
Davis Brown,
by James R. Hodder
Attorney.

UNITED STATES PATENT OFFICE.

DAVIS BROWN, OF BUCYRUS, OHIO, ASSIGNOR TO RAYMOND C. PENFIELD, OF CHICAGO, ILLINOIS.

PROCESS OF AND APPARATUS FOR MOLDING CLAY PRODUCTS.

1,347,484.  Specification of Letters Patent.  Patented July 20, 1920.

Application filed March 13, 1918. Serial No. 222,167.

*To all whom it may concern:*

Be it known that I, DAVIS BROWN, a citizen of the United States, and resident of Bucyrus, in the county of Crawford and State of Ohio, have invented an Improvement in Processes of and Apparatus for Molding Clay Articles, of which the following description, in connection with the accompanying drawings, is a specification, like letters on the drawings representing like parts.

My present invention is a novel process of handling, molding and actuating the mechanism for molding silica brick, tile, blocks and similar refractory clay articles, and consists in the novel combination of brick molding apparatus and jarring mechanism. The object of the invention is to combine in a novel form, brick molding and jolt ramming mechanisms and to employ automatic means which will duplicate in a large degree, the prior hand operations heretofore required, although certain portions of the apparatus may be hand-actuated, if desired. In carrying out the invention I employ a novel type of hopper secured to a reciprocating holder, such as a jolt or jar ramming machine table, and I utilize devices—preferably power-actuated—to force a sand mold into coöperative position with said hopper, to permit the mold and hopper to be vertically reciprocated to shake down the material from the hopper into the mold, then to force the filled mold from the hopper, to position the same for removing the molded brick therein, to actuate the mold by a further vibrating operation in order to free the molded brick from the mold and jar the same loose, preferably actuating all these mechanisms in timed relation, by power devices from a controlling lever.

I believe that the process of thus molding brick utilizing jolt ramming mechanism, is distinctly new, and also the arrangement of power actuated devices to jar the completely molded brick loose from the mold, as well as the combination of these devices, and I therefore wish to claim the same broadly.

Referring to the drawings illustrating a preferred embodiment of the invention,

Figure 1 is a plan view of an apparatus to carry out my present process;

Fig. 2 is a side view;

Fig. 3 is an end view; and

Fig. 4 is an enlarged detailed view through the hopper showing a mold in position under the hopper.

As shown in the drawings I provide apparatus consisting in a base 1, having standards 2, and 3, supporting a power cylinder 4, preferably arranged for actuation by compressed air, and also a standard 5 carrying a table 6 adapted to receive an empty brick mold 7. The power cylinder 4 has a piston 8 carrying a presser plate 9 in position to engage the side of the brick mold 7 and force the same in position under the hopper 10. This hopper 10 is mounted over and secured to a reciprocating table 11 on a power cylinder 12 vertically positioned thereunder, and secured to a plate 13 attached to the base 1. This table 11 and cylinder 12 may be of the usual jolt ramming molding machine construction, adapted to be operated by power, also preferably compressed air, from a cylindrical intake 14 on the side. The hopper 10 is secured to the top of the table 11 by means which will space the hopper therefrom a sufficient distance to permit a brick mold 7 to be inserted thereunder, and just give clearance therefor. Any suitable means may be employed for this apparatus, but I prefer to provide a set of uprights 15, 15, at each corner of the hopper, secured at 16, 16, to the corresponding corners of the movable table 11, the hopper 10 being bolted or otherwise held by these supports and by cross ties 17 and 18 around the top of the hopper. This hopper 10 is kept partially filled with the material for the brick to be molded and is in suitable condition so that the grids 20, 20, in the bottom of the hopper, will hold the material therein permitting the mold 7 to be slid into position or removed therefrom, and another mold to be slid under the hopper with the mold recesses 21, 21, therein, in alinement with the corresponding openings or slots 22, 22, between the grids 20, and then said material is forced into the brick mold by the vertical reciprocation of the hopper, table and mold. Such jar molding apparatus is usually operated at a speed of from one hundred to one hundred and thirty times per minute, causing the material in the hopper 10 to settle down through the grids and into the brick mold 7, being firmly compacted into said molds.

Coöperating with the apparatus thus far described, I also provide means for receiving the completed mold from the hopper and jolt ramming machine, means to invert the same, and means to jar the molded brick loose from the mold when inverted. To this end, on the base 1, a pair of standards 23 and 24 are erected, carrying a table 25 having depending lugs 26, 26, to receive a hinge rod 27 extending lengthwise of the table 25 and constituting a pivot on which said table may be turned to be inverted. A brick mold 7 being forced out from under the hopper 10, slides upon the table 25. A pallet is then placed on top of this mold and clamped to the table 25, whereupon said table 25 is swung over upon the hinge 27 inverting the table, mold and pallet, and allowing the brick within the mold recesses to rest directly upon the pallet. When in this position I provide further vibrating means to jar the molded brick loose from the mold 7. This construction includes a pair of arms 30, 30, secured by a set of brackets 31 to each pair of standards 23, each bracket carrying a cylinder 33 at the outer end, adapted to be power actuated with the piston 34 of each cylinder affixed to a cross head 35 having a pair of lugs 36, 36, in position to jar against the table 25 when the latter is in inverted position when the molded brick resting upon the pallet on the arms 30, cross braces 38 and 39 uniting the arms 30, afford a skeleton table on which the pallet, brick, mold and table 25 rest when the latter is inverted, as above explained, said skeleton support being at appropriate distance below the hinge 27 so as to provide for the thickness of the pallet, mold 7 and table 25, as clearly shown in the drawings.

The apparatus thus far described can be operated in any desired manner, the process consisting in first filling the hopper 10, positioning the mold on the table 6 in front of the presser 9, actuating the cylinder 4 to press said mold under the hopper, then vertically reciprocating the hopper and mold by operation of the jolt ramming portions of the machine, then positioning an empty mold between the presser 9, which has been withdrawn to original position, and the filled mold, again actuating the cylinder 4 to press the empty mold against the filled mold, forcing said filled mold out from under the hopper and position the empty mold therein, swinging the table and its now filled mold, which has been temporarily clamped or held thereon, on the pivot 27 to inverted position and jarring the mold loose from the brick, lifting out the now freed mold 7 and reposition it on the table 6 in position to repeat the operation.

In order to actuate the apparatus and carry out this process by power mechanism, I prefer to utilize a compressed air system, a pipe 40 from any suitable source of power being conducted to the apparatus and to a valve 41, which valve is controlled by a lever 42, branch pipes 43 and 44 from said valve 41 extending to opposite ends of the cylinder 4. A further branch pipe 45 from the valve 41 leads downwardly to the pipe 46 connecting with the cylinder 14 of the jolt ramming machines and from thence leading onwardly by the pipe 47 and branches 48 to the cylinders 33, 33, and each side of the other end of the apparatus at the receiving table. A valve 50 controls these cylinders 33. The operator moves the handle 42 and permits the air under pressure to actuate the cylinder 4 through the pipe 43, moving the presser 9 forwardly, retraction of the handle 42 actuating the cylinder reversely through the air pipe 44 and simultaneously supplying the air under pressure to the jolt ramming cylinder, further downward movement of the handle 42 shutting off both valves, and permitting the valve 53 to be operated at the convenience of the operator, after the brick mold has been turned over, whereupon the cylinders 33, 33, jar the mold while in inverted position free from the brick.

My invention is further described and defined in the claim as follows:

Apparatus of the kind described for forming clay articles, comprising a mold receiving table, a power actuated cylinder in alinement with said table, jolt ramming mechanism having a vertically removable table normally at rest and in alinement with the mold receiving table, a hopper carried by said vertically reciprocating table and spaced therefrom, and automatic means to actuate said power cylinder and jolt ramming mechanism, whereby an empty mold applied to the mold receiving table will be forced under the hopper and thereupon subjected to jolt ramming action with said hopper to fill the mold, the action of the cylinder forcing said mold into position, being automatically retracted to receive a second empty mold, and the successive action of the cylinder removing the filled mold and positioning the second empty mold under the hopper.

In testimony whereof I have signed my name to this specification in the presence of two subscribing witnesses.

DAVIS BROWN.

Witnesses:
A. B. BRADSTOCK,
LAURA M. ASH.